(12) United States Patent
Schmidt et al.

(10) Patent No.: US 8,970,342 B2
(45) Date of Patent: Mar. 3, 2015

(54) SYSTEM WITH PRESENCE DETECTOR, METHOD WITH PRESENCE DETECTOR, PRESENCE DETECTOR, RADIO RECEIVER

(71) Applicant: EnOcean GmbH, Munich (DE)

(72) Inventors: Frank Schmidt, Altkirchen (DE); Armin Anders, Taufkirchen (DE); Christian Bach, Munich (DE)

(73) Assignee: EnOcean GmbH, Oberhacing (DE)

( * ) Notice: Subject to any disclaimer, the term of this patent is extended or adjusted under 35 U.S.C. 154(b) by 0 days.

(21) Appl. No.: 14/012,792

(22) Filed: Aug. 28, 2013

(65) Prior Publication Data

US 2014/0091899 A1    Apr. 3, 2014

Related U.S. Application Data

(63) Continuation of application No. 12/670,985, filed as application No. PCT/EP2008/059820 on Jul. 25, 2008, now abandoned.

(30) Foreign Application Priority Data

Aug. 10, 2007    (DE) .......................... 10 2007 037 896

(51) Int. Cl.
    *G05B 19/00*    (2006.01)
    *G05B 1/01*    (2006.01)
    *H05B 37/02*    (2006.01)

(52) U.S. Cl.
    CPC .............. *G05B 1/01* (2013.01); *H05B 37/0227* (2013.01); *H05B 37/0272* (2013.01); *Y02B 20/44* (2013.01)
    USPC ............ 340/5.1; 340/506; 340/526; 340/531; 340/539.19; 340/539.26; 340/541; 340/693.1; 340/573.1; 340/573.2; 340/573.4

(58) Field of Classification Search
    USPC ........ 340/5.1, 506, 526, 531, 539.19, 539.26, 340/541, 693.1, 573.1, 573.2, 573.4
    See application file for complete search history.

(56) References Cited

U.S. PATENT DOCUMENTS 3,263,141 A * 7/1966 Nicola ............................ 318/16
4,021,679 A * 5/1977 Bolle et al. .................... 307/117

(Continued)

FOREIGN PATENT DOCUMENTS

CN    1146127    4/2004
DE    297 12 267    11/1997

(Continued)

OTHER PUBLICATIONS

First Office Action in CN Application No. 200880102617.7, dated Aug. 3, 2012.

(Continued)

*Primary Examiner* — George Bugg
*Assistant Examiner* — Paul Obiniyi
(74) *Attorney, Agent, or Firm* — Edward A. Gordon; Foley & Lardner LLP (57) ABSTRACT

The invention relates to a system and a method with at least one presence detector, wherein the presence detector has a radio transmitter. The system further comprises at least one radio receiver that is constructed in such a manner as to receive and evaluate signals of the presence detector transmitted via radio. The radio receiver further comprises at least one device that acts on downstream units as a function of the evaluation result.

15 Claims, 8 Drawing Sheets

(56) References Cited

U.S. PATENT DOCUMENTS

| | | | |
|---|---|---|---|
| 4,148,020 A * | 4/1979 | Siemer et al. | 340/531 |
| 4,191,947 A * | 3/1980 | Bouchard et al. | 340/531 |
| 4,295,079 A * | 10/1981 | Otsuka et al. | 315/130 |
| 4,311,986 A * | 1/1982 | Yee | 340/12.16 |
| 4,356,476 A * | 10/1982 | Healey et al. | 340/522 |
| 4,726,051 A * | 2/1988 | Schuermann | 379/68 |
| 4,800,278 A * | 1/1989 | Taniguti et al. | 250/338.1 |
| 5,023,597 A * | 6/1991 | Salisbury | 340/573.4 |
| 5,099,177 A * | 3/1992 | Taniguchi et al. | 315/130 |
| 5,450,060 A * | 9/1995 | Parkhurst | 340/539.26 |
| 5,455,487 A | 10/1995 | Mix et al. | |
| 5,457,442 A * | 10/1995 | Lucero | 340/693.1 |
| 5,475,035 A | 12/1995 | Park et al. | |
| 5,684,437 A * | 11/1997 | Ago et al. | 333/195 |
| 5,745,035 A * | 4/1998 | Deyo | 340/541 |
| 5,767,603 A * | 6/1998 | Kadota et al. | 310/313 B |
| 5,781,083 A * | 7/1998 | Horiuchi et al. | 333/196 |
| 5,785,243 A * | 7/1998 | Cross | 236/47 |
| 5,793,147 A * | 8/1998 | Kadota et al. | 310/313 R |
| 5,815,067 A * | 9/1998 | Knoble et al. | 340/12.32 |
| 5,914,554 A * | 6/1999 | Kadota et al. | 310/313 B |
| 6,008,756 A * | 12/1999 | Boerhave et al. | 342/357.52 |
| 6,078,257 A * | 6/2000 | Ferraro | 340/568.1 |
| 6,147,609 A * | 11/2000 | Spies | 340/573.2 |
| 6,237,106 B1 | 5/2001 | Koyama et al. | 713/502 |
| 6,265,974 B1 * | 7/2001 | D'Angelo et al. | 340/568.1 |
| 6,317,309 B1 * | 11/2001 | Baumann et al. | 361/160 |
| 6,320,506 B1 * | 11/2001 | Ferraro | 340/568.1 |
| 6,356,192 B1 * | 3/2002 | Menard et al. | 340/539.19 |
| 6,359,564 B1 * | 3/2002 | Thacker | 340/573.1 |
| 6,388,573 B1 * | 5/2002 | Smith et al. | 340/556 |
| 6,674,403 B2 * | 1/2004 | Gray et al. | 342/463 |
| 6,950,019 B2 * | 9/2005 | Bellone et al. | 340/539.11 |
| 7,005,990 B1 * | 2/2006 | Rocci | 340/573.1 |
| 7,079,027 B2 * | 7/2006 | Wojcik | 340/539.26 |
| 7,206,521 B2 * | 4/2007 | Doh et al. | 398/202 |
| 7,346,336 B2 * | 3/2008 | Kampel et al. | 455/404.2 |
| 7,492,255 B1 * | 2/2009 | Morris | 340/541 |
| 7,511,587 B2 * | 3/2009 | Martin | 331/107 A |
| 7,511,615 B2 * | 3/2009 | Shahar | 340/555 |
| 7,580,809 B2 * | 8/2009 | Takeuchi | 702/153 |
| 7,692,517 B2 * | 4/2010 | Martin et al. | 333/195 |
| 7,786,862 B1 * | 8/2010 | Campbell | 340/569 |
| 7,804,252 B2 * | 9/2010 | Chen | 315/152 |
| 7,847,647 B2 * | 12/2010 | Martin et al. | 331/107 A |
| 8,031,074 B2 * | 10/2011 | Lizza | 340/573.1 |
| 8,134,416 B2 * | 3/2012 | Moiraghi et al. | 331/107 A |
| 8,378,820 B2 * | 2/2013 | Micko | 340/565 |
| 2002/0011570 A1 * | 1/2002 | Castleman | 250/339.15 |
| 2002/0173940 A1 * | 11/2002 | Thacker et al. | 703/5 |
| 2003/0043073 A1 * | 3/2003 | Gray et al. | 342/465 |
| 2003/0067399 A1 * | 4/2003 | Wesley | 340/907 |
| 2004/0246122 A1 * | 12/2004 | Bailey, III | 340/506 |
| 2005/0230490 A1 * | 10/2005 | Pouchak et al. | 237/81 |
| 2005/0237208 A1 * | 10/2005 | Wojcik | 340/573.2 |
| 2006/0035622 A1 * | 2/2006 | Kampel et al. | 455/404.2 |
| 2006/0069463 A1 * | 3/2006 | Kim | 700/245 |
| 2006/0149496 A1 * | 7/2006 | Takeuchi | 702/150 |
| 2006/0202782 A1 * | 9/2006 | Martin et al. | 333/195 |
| 2006/0280575 A1 * | 12/2006 | Ruettiger | 411/15 |
| 2007/0109175 A1 * | 5/2007 | Fukuda | 342/70 |
| 2008/0013317 A1 * | 1/2008 | Hinds | 362/286 |
| 2008/0106346 A1 * | 5/2008 | Martin | 331/107 A |
| 2008/0157965 A1 * | 7/2008 | Shahar | 340/556 |
| 2009/0160567 A1 * | 6/2009 | Martin et al. | 331/107 A |
| 2009/0212956 A1 * | 8/2009 | Schuman et al. | 340/573.1 |
| 2010/0201267 A1 * | 8/2010 | Bourquin et al. | 315/32 |
| 2010/0230595 A1 * | 9/2010 | Uchida et al. | 250/338.4 |
| 2010/0327766 A1 * | 12/2010 | Recker et al. | 315/291 |
| 2011/0121654 A1 * | 5/2011 | Recker et al. | 307/66 |
| 2012/0001548 A1 * | 1/2012 | Recker et al. | 315/86 |
| 2012/0080944 A1 * | 4/2012 | Recker et al. | 307/25 |

FOREIGN PATENT DOCUMENTS

| | | | |
|---|---|---|---|
| DE | 196 25 235 | 2/1998 | |
| DE | 100 63 305 | 9/2001 | |
| DE | 103 09 334 | 9/2004 | |
| DE | 10 2004 049 819 | 5/2006 | |
| EP | 1 626 379 | 2/2006 | |
| EP | 1626379 A2 * | 2/2006 | G08B 21/04 |
| JP | 2003-133081 | 5/2003 | |
| JP | 2007-174095 | 7/2007 | |

OTHER PUBLICATIONS

Office Action in U.S. Appl. No. 12/670,985, dated Feb. 28, 2013.

* cited by examiner

SYSTEM WITH PRESENCE DETECTOR, METHOD WITH PRESENCE DETECTOR, PRESENCE DETECTOR, RADIO RECEIVER

RELATED APPLICATIONS

This application is a continuation of U.S. patent application Ser. No. 12/670,985, filed Aug. 16, 2010, which is a U.S. National Stage of P.C.T. International Application No. PCT/EP2008/059820, filed Jul. 25, 2008, which claims priority to German Patent Application No. 102007037896.5, filed Aug. 10, 2007. The entire contents of the foregoing applications are incorporated herein by reference.

The invention relates to a system and a method with at least one presence detector, wherein the presence detector has a radio transmitter. The system further comprises at least one radio receiver, which is constructed to be able to receive and evaluate signals of the presence detector that are transmitted via radio. The radio receiver further comprises at least one device that acts on downstream devices as a function of the evaluation. For instance, a switching element turns an electrical load, such as a lighting unit, on and off, i.e., couples it to and decouples it from a source of power. The invention further relates to a presence detector that detects the presence of a person inside a space or an area, or senses and reports it. The invention further relates to a radio receiver that is constructed to couple an electrical terminal to a source of electrical energy, and thus supply an electrical load connected to the terminal with electrical energy.

Electrical loads such as lighting units and other electrically operated apparatuses are connected to the public power supply network, for example, which can be a 50-60 Hz, 220-230 VAC network. The electrical loads are generally turned on and off by electromechanical switching elements or are completely coupled to or decoupled from the energy supply formed by the electric power network. The switching loads in these cases are frequently part of the electrical installations in the house. It is possible to perform the switching process with a wirelessly transmitted command by means of a radio receiver and the corresponding radio transmitter. It is additionally possible, as shown in the document DE 10309334, to provide an energy-autonomous movement detector. The latter is activated, for instance, by a movement of a person inside its area of effect and is supplied with energy. With this energy, the radio receiver transmits a radio signal. The transmitted radio signal can be received by all the radio receivers in the vicinity that are associated with the radio transmitter, and can be evaluated specifically at each receiver. After the evaluation, the radio receiver passes data signals to addressable receiver systems that are coupled to the radio receiver. These in turn perform an action such as switching on a lighting unit or an electrical load. Thus the lighting unit is turned on as a result of the detected motion and requires or uses electrical energy. Switching elements that allow a user to turn off the electrical load or decouple it from the source of electrical energy are provided for shutting off the lighting unit. The user may be distracted by other things, forget to separate the electrical load from the energy source by switching it off, and it will then unnecessarily consume electric power or electrical energy until another user notices it.

It is consequently the object of the invention to automatically decouple unneeded electrical loads from the power network and from the energy source.

The measures described below are provided to perform this object. A system according to claim 1 or 16, a method according to claim 31 or 32, a presence detector according to claim 33 or a radio receiver according to claim 42 are provided to perform this object. The measures described in the claims that are directly or indirectly subordinated to the above-mentioned claims develop these measures in an advantageous manner.

The system and the method will be described in detail below. The motion detector and the radio receiver will then be described in detail.

Thus a system that comprises the components described in detail below is proposed. The system accordingly comprises at least one presence detector, at least one electrical terminal for an electrical load and at least one radio receiver. The presence detector is constructed to transmit at least first one predeterminable signal or at least one second predeterminable signal by means of the first radio transmitter. These signals can be predetermined by means of a device that allows a user or a skilled person to select various signals while setting up the presence detector, or during the initial installation of the system. It is thus possible to achieve an unambiguous association of presence detector and radio transmitter within radio range.

A presence detector is a device that is constructed to determine the presence of persons in an observation area. This definition comprises not only a motion, but also can also comprise a nonmoving or very slowly moving person. The presence detector achieves this by means of a presence sensor, which is constructed for instance as an infrared sensor, in particular, a passive infrared sensor (PIR). An infrared sensor converts infrared radiation or heat radiation, into an electrical signal. Such a passive infrared sensor is particularly suited for detecting a moving person. A timing element is, for example, an electronic clock or an electrical capacitor that has a predeterminable discharge time when coupled to an electrical resistor. A radio transmitter is an electronic circuit arrangement or an electrical device that transmits analog or digital signals containing information or data by means of wireless transfer. For example, a radio transmitter modulates the signals to be transmitted onto a so-called carrier signal. The carrier signal, high-frequency electromagnetic waves for example, wirelessly transports the signal to be transferred to a remote location. At the remote location, there is a radio receiver that separates the signal to be transmitted from the carrier signal and supplies it for further processing.

The presence sensor of the presence detector is connected to the first radio transmitter and, after presence has been sensed, initiates, by means of an initiation signal to the first radio transmitter, the transmission of the first signal. A sensed presence is understood to mean the presence of a person or a relatively large animal in the space to be monitored. Adjustment possibilities, with which the sensitivity and/or the response behavior of the presence sensor can be adjusted, are provided on the presence detector. The first signal is sent again at each response of the presence sensor. If there is not another response of the presence sensor over a predeterminable time period after the transmission of the first predeterminable signal, then there is a transmission of a second predeterminable signal. The predeterminable time period is adjustable even after installation of the system. An adjustment possibility, which is designed to be easily accessible, is provided for this purpose on the presence detector. It may be provided, for instance, by a rotary potentiometer. The first and the second predeterminable signals differ from one another. The signal can be provided, for example, by a short pulse of identical duration, which is transmitted at two different frequencies for differentiation. Or the two signals can be distinguished from one another by the signal duration or a pulse sequence.

The radio receiver is constructed to couple an electrical energy source to or decouple it from an electrical load by means of a switching element. If the radio receiver receives the first predeterminable signal, the electrical load is coupled by means of the switching element to the electrical energy source, if the radio receiver receives the second predeterminable signal, the electrical load is decoupled from the electrical energy source.

This solution combines more than one advantage. First, the electrical load is coupled to the energy source by a sensed presence, and is thus in operation or at least ready for operation, since it is coupled or connected to the energy source. Second, the electrical load is automatically disconnected from the energy supply if no presence can be determined over a predeterminable time.

A possibility of turning the load on and off by means of a manually operated switch is provided in one refinement of the system as an additional possibility for turning the load on and off. A hardwired electromechanical switching element, having two switch positions, open or closed, is also provided. This can be a toggle switch, for example, the first switch position of which means "on" and the second switch position of which means "off." Such a toggle switch is thus formed by an electromechanical switching element with a make-and-break contact. This electromagnetic switching element is connected to the radio receiver and connects the line potential, 220-230 V, for example, to a specially provided voltage input on the radio receiver. The input is designed such that if a predetermined voltage level such as a line voltage of 230 VAC is present at this input, it is evaluated by the radio receiver the same as the reception of the first predeterminable signal. A decrease in the line voltage is then evaluated by the radio receiver like the reception of the second predeterminable signal. Thus the electrical load is connected to or disconnected from the electrical energy source by the hardwired switching element or the manually operated switch.

The hardwired electromagnetic switching element can be used in principle in two different embodiments; as a momentary contact switch in one embodiment, or as a rocker switch in the other embodiment. Only short switching pulses are transmitted in the embodiment as a momentary contact switch. The input at the radio receiver is constructed, in comparison with the preceding example, such that a short switching pulse is interpreted as the first or the second radio signal. This depends on the momentary switch position of the switching element that couples the load to the electrical energy source. That is to say, each switching pulse at the input brings about a change of state at the output. If the output is at zero voltage, then a switching pulse at the input brings about a connection of the potential at the given phase conductor to the electrical load.

Alternatively to being connected to the line voltage, the switch can also be set up to be potential-free, and merely coupled to the radio receiver that evaluates the switch position of the contact, open or closed. For instance, the closed switch position would be evaluated as a first predeterminable radio signal, and an open switch position as a second predeterminable signal.

If the electrical load in the system is turned on by means of the switch and there is no determined presence in the area monitored by the presence detector after a relatively long time, or until the lapse of the predeterminable time period, then the presence detector transmits the second predeterminable signal to the radio receiver. At the radio receiver, this brings about a signal to the first switching element, whereupon the electrical load is decoupled from the electrical source. For this purpose, the presence detector always transmits the second predeterminable signal at a predetermined time interval following the last sensed presence, and thus effects a shutoff of the load whenever no presence in the area of the presence sensor was detectable over the duration of a predetermined time period. Independently of the manner in which the load was coupled to the energy source, it is thus decoupled from the energy source. It is advantageous in the embodiment with a hardwired switching element that, independently of how the electric power network or the energy source is coupled to the electrical load, whether this happened due to the presence detector or the switch, the presence detector causes the radio receiver to disconnect the load from the electrical energy source, the electric power network, after a predetermined time.

Alternatively or in combination with the previous possibility of a hardwired switch, a refinement of the system provides the possibility of transmitting a first predeterminable signal to the radio receiver by means of a wireless switch as well, thus likewise bringing about a coupling of the energy source to the electrical load. A wireless switch offers the particular advantage of being placed at an arbitrary site without additional installation, easily and without the considerable expense of installation. One need only take into account the range of the radio signal transmitted by the wireless switch.

For the above purpose, the wireless switch has an actuation element and an electromagnetic energy converter, the energy converter being coupled to the actuation element, and input mechanical force being converted into electrical energy. To carry out a switching process, an input of mechanical force onto the actuation element is necessary in any case. The electrical energy generated in this way is supplied to a second radio transmitter that is integrated into the wireless switch. The wireless switch thereby sends the first predeterminable signal. This signal is received and evaluated by the radio receiver.

It is advantageous to construct the wireless switch such that it also comprises at least one actuation sensor. The wireless switch preferably comprises a first and a second actuation sensor with which a respective first or second actuation direction is detected. The respective first or second predeterminable signal is transmitted, depending on which actuation direction was detected. It is thus assured that at least two different signals can be sent to the radio receiver, with these again bringing about at the radio receiver either a coupling of the load to the energy source or a decoupling of the load. These signals correspond to the first or second predeterminable signal, respectively.

It is advantageous to design the presence detector to be energy-autonomous, i.e., the presence detector is independent of a hardwired electrical energy supply. The energy for operating the presence detector and its components is supplied from the energy available from the environment, so that no battery is necessary for operation. The components of the presence detector include, for instance, a detector circuit, a presence sensor connected to it and the radio transmitter. The energy supply is formed, for instance, by a photoelectric energy converter such as one or more solar cells. In view of the savings of energy then available in the presence detector in this case, the detector circuit must be specially designed for extremely low-power operation. This is the only component of the presence detector that must always be supplied with energy. Even the timing element is not supplied with energy all the time, but only for the duration of the predeterminable time period until the second predeterminable signal is sent. With this signal, all unneeded components of the presence detector are shut off. The presence sensor, which must likewise be supplied with energy, is connected to the detector circuit. In order to save energy with the presence sensor, an operating mode of the detector circuit is proposed that provides on-phases and off-phases over time for the detector circuit, the off-phases being chosen with respect to the on-phases such that a high duty ratio between on-phases and off-phases results. Thereby optimally long operating periods of the presence detector can be realized even in dark phases, i.e., in phases in which no energy supply from light or other environmental energy is possible.

An energy-autonomous motion detector is operated by electrical energy that is obtained by converting so-called environmental energy into electrical energy. Environmental energy is understood to mean forms of energy such as heat, motion or other forms of energy that can be converted by means of converter elements into electrical energy. These include, for example, thermoelectric elements, piezoelectric elements, photovoltaic elements, Seebeck elements, pyroelectric elements, or other elements that transform physical values into separated electrical charges.

In order to increase transmission security, the radio signals of the presence detector or the wireless switch are transmitted with a large bandwidth and/or in a temporal sequence.

The system described below differs from the aforementioned system in, among other things, the arrangement of the timing element on/in the radio receiver, whereas the timing element in the above-described system is arranged on/in the presence detector. Two additional distinguishing features result from this difference. The arrangement of the timing element on/in the radio receiver hence does not require any transmission of the second predeterminable signal from the presence detector to the radio receiver. This results from the fact that the decoupling of the electrical energy source from the terminal for the electrical load is initiated by the reaching of a temporal endpoint of the timing element.

A system is additionally proposed which likewise solves the problem, but differs from those described above in regard to certain characteristics, and comprises characteristics that will be described below. The system thus likewise comprises at least one presence detector, at least one electrical terminal for an electrical load and at least one radio receiver. The presence detector itself comprises at least one presence sensor and at least one first radio transmitter, the presence detector being constructed to transmit at least one first predeterminable signal by means of the first radio transmitter. This signal can be predetermined by means of a device, whereby it is possible to select from various signals during the setup of the presence detector or the initial installation of the system. It is thus possible to produce a clear and unambiguous association of presence detector and radio receiver inside the radio range of the presence detector.

The presence sensor of the presence detector is connected to the first radio transmitter, and, by means of an initiation signal to the first radio transmitter, effects the transmission of the first signal after a presence is sensed. A sensed presence is to be understood as the presence of a person or a relatively large animal in the space to be monitored. Adjustment possibilities, with which the sensitivity and/or the response behavior of the presence sensor is/are adjustable, are provided on the presence detector.

The radio receiver is constructed to couple an electrical terminal for an electrical load to an electrical energy source by means of a switching element, or to decouple it. If the radio receiver receives the first predeterminable signal, the electrical load is coupled by means of a switching element to the electrical energy source. The radio receiver comprises a timing element. After the lapse of a predeterminable time period following the time of the last reception of the first predeterminable signal, the radio receiver decouples the electrical terminal from the electrical energy source.

This solution combines more than one advantage. First, the electrical load is coupled to the energy source by a sensed presence, and is thus in operation or at least ready for operation since it is coupled or connected to the energy source. Second, the electrical load is disconnected from the energy supply if no presence can be detected over a predeterminable time. Energy savings for the position detector are also achievable, since the timing element in this system is arranged on the radio receiver. The timing element thus does not burden the scarce energy resources at the position detector. With respect to the above-described system, the motion detector is additionally relieved of the burden of transmitting the second predeterminable signal.

The possibility of turning the load on and off by means of a manually operated switch is provided in a refinement of the system as an additional possibility for turning the load on and off. Here a hardwired electromechanical switching element is provided that has two switch positions, open or closed. This can be a toggle switch, for example, the first switch position of which is "on" and the second switch position of which is "off." Such a toggle switch is thus formed by an electromechanical switching element with a make-and-break contact. This electromagnetic switching element is connected to the radio receiver and switches, for instance, the line potential, 220-230 V for example, to a specially provided voltage input on the radio receiver. The input is designed such that if a predetermined voltage level such as a line voltage of 230 VAC is present at this input, it is evaluated by the radio receiver the same as the reception of the first predeterminable signal. Thus a predeterminable time begins to run at the timing element; after the lapse of the predeterminable time, the radio receiver decouples the electrical terminal from the electrical energy source. This process is interrupted by a reception of the first predeterminable signal and starts over.

The hardwired electromagnetic switching element can be used in principle in two different embodiments: as a momentary contact switch in one embodiment, or as a rocker switch in the other embodiment. Only short switching pulses are transmitted in the embodiment as a momentary contact switch. The input at the radio receiver is constructed, in comparison with the preceding example, such that a short switching pulse is interpreted as the first or the second radio signal. This depends on the momentary switch position of the switching element that couples the load to the electrical energy source. Alternatively to being connected to the line voltage, the switch can also be set up to be potential-free, and merely coupled to the radio receiver that evaluates the switch position of the contact, open or closed.

If the electrical load in the system is turned on by means of the switch and there is no reaction of the presence sensor in the area monitored by the presence detector after a relatively long time, or until the lapse of the predeterminable time period, then the radio receiver supplies a signal to the first switching element, whereupon the electrical load is decoupled from the electrical source. The radio receiver performs a disconnection of the electrical load from the electrical energy source at a predetermined time interval following the last sensed presence, i.e., after the last reception of the first predeterminable signal. The time sequence is interrupted by a new reception of the first predeterminable signal and starts over. It is advantageous in the embodiment of the hardwired switching element that, independently of how the electric power network or the energy source is coupled to the electrical load, whether this happened due to the presence detector or the switch, the presence detector has the effect that, after a predetermined time, the radio receiver disconnects the load from the electrical energy source, the electric power network.

Alternatively or in combination with the possibility of a hardwired switch, a refinement of the system provides the possibility of transmitting a first predeterminable signal to the radio receiver by means of a wireless switch as well, thus likewise bringing about a coupling of the energy source to the electrical load. In particular, a wireless switch offers the advantage of being placed at an arbitrary site without additional installation, easily and without the considerable expense of installation. One need only take into account the range of the radio signal that is transmitted by the wireless switch.

For the above purpose, the wireless switch has an actuation element and an electromagnetic energy converter, which is coupled to the actuation element, and when a mechanical force is applied to the actuation element, which is necessary in any case for a manually operated switching process, this input mechanical force is converted into electrical energy. The electrical energy thereby generated is supplied to a second radio transmitter that is integrated into the wireless switch. The wireless switch thereby sends the first predeterminable signal. This signal is received and evaluated by the radio receiver.

It is advantageous to construct the wireless switch such that it also comprises at least one actuation sensor. The wireless switch preferably comprises a first and a second actuation sensor, with which a respective first or second actuation direction is detected. The respective first or second predeterminable signal is transmitted, depending on which actuation direction was detected. It is thus assured that at least two different signals can be sent to the radio receiver, with these again bringing about at the radio receiver either a coupling of the load to the energy source or a decoupling of the load.

It is advantageous to design the presence detector to be energy-autonomous, i.e., the presence detector is independent of a hardwired electrical energy supply. The energy for operating the presence detector and its components is supplied from the energy available from the environment, so that no battery is necessary for operation. The components of the presence detector include, for instance, a detector circuit, a presence sensor connected to it and the radio transmitter. The energy supply is formed for instance by a photoelectric energy converter such as one or more solar cells. In view of the savings of energy then available at the presence detector in this case, the detector circuit must be specially designed for extremely low-power operation. This is the only component of the presence detector that must always be supplied with energy. Even the timing element is not supplied with energy all the time, but only for the duration of the predeterminable time period until the second predeterminable signal is sent. The presence sensor, which must likewise be supplied with energy, is connected to the detector circuit. In order to save energy with the presence sensor, an operating mode of the detector circuit is proposed that provides on-phases and off-phases of the detector circuit over time, the off-phases being chosen with respect to the on-phases such that a high duty ratio between on-phases and off-phases results. Optimally long operating periods of the presence detector can thereby be realized even in dark phases, i.e., in phases in which no energy supply from light or other environmental energy is possible.

In order to increase the transmission security, the radio signals of the presence detector or the wireless switch are transmitted with a large bandwidth and/or in a temporal sequence.

The problem is also solved by means of a presence detector. The presence detector comprises at least one presence sensor and at least one first radio transmitter, the presence detector being constructed to transmit at least one first predeterminable signal or at least one second predeterminable signal by means of the first radio transmitter. These signals can be predetermined by means of a device that allows a user or a skilled person to select various signals while setting up the presence detector, or during the initial installation of the system. It is thus possible to achieve a clear and unambiguous association of presence detector and radio receiver within the radio range of the presence detector.

The problem is also solved by means of a radio receiver. The radio receiver is constructed to couple an electrical terminal for an electrical load to an electrical energy source by means of a switching element, or to decouple it. If the radio receiver receives a first predeterminable signal the electrical load is coupled by means of the switching element to the electrical energy source. The radio receiver comprises a timing element. After the lapse of a predeterminable time period following the time of the last reception of the first predeterminable signal, the radio receiver decouples the electrical terminal from the electrical energy source. With each newly received first predeterminable radio signal, the timing element is reset and the running of the predeterminable time starts over. That is to say, the electrical terminal is decoupled from the electrical energy source by means of the radio receiver only if no predeterminable radio signal was received past the predeterminable time period.

Figure 1:
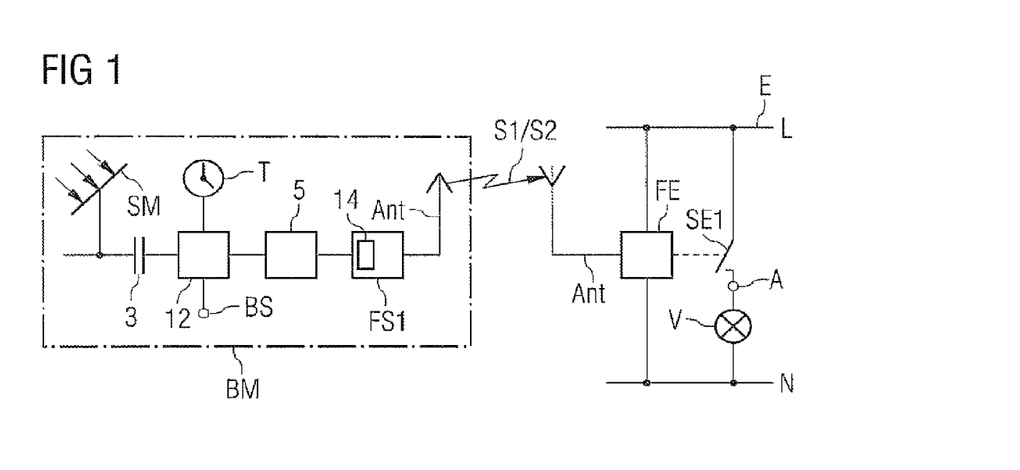
FIG. 1, a system with presence detector, radio receiver and load.

FIG. 1 shows an embodiment of the system with a presence detector BM and a radio receiver FE, wherein radio receiver FE is connected to an electrical energy source E. Electrical energy source E in this and also in the additional embodiments is formed by a power supply network of a 220-230 VAC network. A phase conductor L and a neutral conductor N are provided there. There is a potential difference between these conductors L and N. An electrical load V is coupled to energy source E by means of a terminal A, which can be connected by radio receiver FE to the potential of phase line L. This takes place by means of radio receiver FE and a first switching element SE1, which is coupled to electrical energy source E. For this purpose, first switching element SE1 is connected to phase line L of electrical energy source E. First switching element SE1 closes the contact, then phase line L and thus the potential present there is connected to terminal point A and is available to electrical load V. In this switching state, electrical load V is supplied with electrical energy. First switching element SE1 is coupled to radio receiver FE in such a way that first switching element SE1 is opened or closed by radio receiver FE. The radio receiver has an antenna ANT with which radio signals can be received and supplied to the radio receiver. The radio receiver itself is likewise connected to energy source E between phase and neutral lines L and N.

Position detector BM is arranged at an installation site remote from the radio receiver. Position detector BM has its own energy supply by means of a storage element 3. The position detector is thus independent of a hardwired energy source. Storage element 3 is connected to an energy converter that converts environmental energy into electrical energy. Such an energy converter is formed in the illustration by the schematically represented solar module SM, formed in this embodiment by solar cells, which convert light into electrical energy. The electrical energy thereby obtained is supplied to storage element 3. By means of an electrical connection between storage element 3 and a detector circuit 12, the electrical energy of storage element 3 is available to detector circuit 12 for its operation. Detector circuit 12 is constructed to supply the additional components of presence detector BM with energy. Thus, presence sensor BS, a control circuit and a first radio transmitter FS1 and a connected antenna, as well as a timing element T are connected to the detector circuit. A transmission antenna Ant is connected to the first radio transmitter. The frequency-determining component of the radio transmitter is a surface wave resonator 14.

Presence sensor BS is constructed as an infrared sensor for example, so that the presence of a person inside the range of presence sensor BS is transmitted by an electrical signal to the detection unit. With an appropriate adjustment and calibration of the infrared sensor it is thus possible to sense the presence of a person even if he is moving only a little or not at all. Detector circuit 12 of presence detector BM evaluates this signal and passes it on to control circuit 5, which is supplied with energy by detector circuit 12 only if presence sensor BS has detected a presence. Control circuit 5 thus begins to convert the information of presence sensor BS into a signal that is emitted by radio transmitter FS1 via an antenna. If the presence detector senses a presence in the area, then a first predeterminable signal S1 is transmitted.

The timing element that is coupled to detector circuit 12 is additionally reset to "zero" at each detected presence, and restarts the running of the predetermined time period whenever a presence is detected by presence sensor BS. Timing element T runs over a predeterminable time period t, with a signal being transmitted to detector circuit 12 regarding the end of the predeterminable time period after the predeterminable time period t has expired. Triggered by this information, control circuit 5 and the downstream first radio transmitter FS1 with surface wave resonator 14 and antenna ANT are activated by detector circuit 12. From the information of the expired time period t, control circuit 5 forms a second predeterminable signal S2, which is emitted via radio transmitter FS1 and the connected antenna ANT.

Thus an energy-autonomous presence detector BM is created that transmits a first predeterminable signal S1 as a function of a presence, or a second predeterminable signal S2 as a function of a time period t in which no presence has taken place. The transmitted first or second predeterminable signal S1 or S2 is received by radio receiver FE via its antenna ANT. Radio receiver FE evaluates the received signals and determines whether a signal S1 or a signal S2 was received.

If radio receiver FE receives first predeterminable signal S1, then switching element SE1 is closed via radio receiver FE and is thus connected to the output A for connecting load V to energy source E and thus to the potential of phase L. Thus the load, which is arranged between terminal A and neutral conductor N, has electrical energy available. If the radio receiver receives the predeterminable signal S2, then the radio receiver effects an opening of first switching element SE1 and thus a cutoff of electrical energy at terminal A, whereby there is a decoupling of electrical load V from electrical energy source E.

The arrangement of the individual subcomponents of the system with respect to one another is schematically shown in FIG. 1. For example, an installation can be arranged as follows. The radio receiver is arranged in a wall socket in which direct incoming phase and neutral lines are provided. The electrical load, a lighting unit, for example, is arranged on a room ceiling and is connected to output A and the neutral conductor. The presence detector is arranged remotely, on a wall opposite the room door, for example, and covers the entire space within its range. If a person enters this space through the room door, then the light on the room ceiling turns on according to the principle described above. After the person leaves the room, a presence can no longer be determined. After a presence has been sensed for the last time, the timing element begins to run for the predeterminable time period. When the time period has elapsed, the lighting unit is turned off. The selection of the installation site for the presence detector depends upon its range and the space to be monitored. Because of the energy-autonomous design of the presence detector, it can be mounted completely independently of any existing energy installation.

Figure 2:
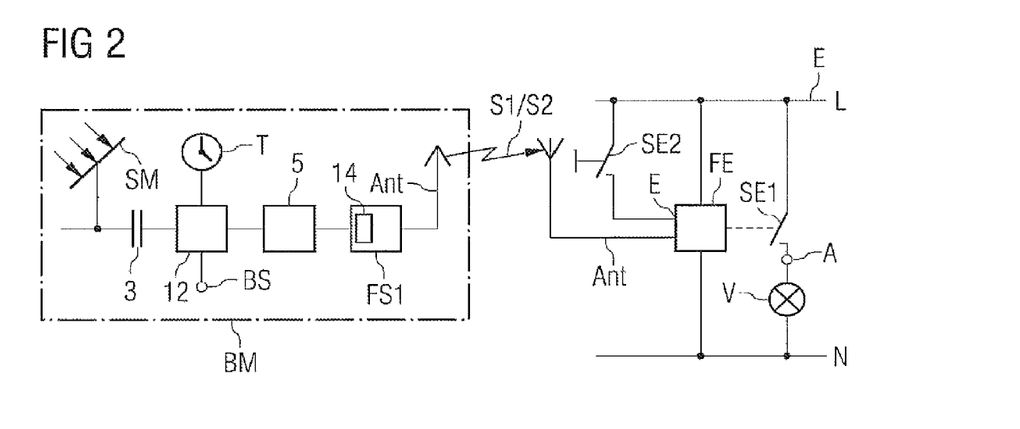
FIG. 2, a system with presence detector, radio receiver, load and hardwired switch, FIG. 3, a system with presence detector, radio receiver, load, hardwired switch and wireless switch, FIG. 4, a system with presence detector, radio receiver, load and wireless switch, FIG. 5, a schematic representation of the radio receiver and its subcomponents, FIG. 6, a system with presence detector, radio receiver and load, FIG. 7, a system with presence detector, radio receiver, load and hardwired switch, FIG. 8, a system with presence detector, radio receiver, load, hardwired switch and wireless switch, FIG. 9, a system with presence detector, radio receiver, load and wireless switch, FIG. 10, a schematic representation of the radio receiver and its subcomponents, FIG. 11, a process sequence diagram, FIG. 12, a process sequence diagram.

FIG. 2 shows the system arrangement already described in FIG. 1, wherein, in comparison with the embodiment described in FIG. 1, a second electromechanical switching element SE2 is additionally provided in the embodiment of FIG. 2 as an alternative possibility for switching the electrical load on and off. Switching element SE2 is connected in this embodiment to phase conductor L and is constructed as a normally open contact. Thus the potential of phase conductor L is applied with the second electromagnetic switching element to an input E of the radio receiver provided for it in the radio receiver. The radio receiver is constructed such that a phase potential present at the aforementioned input E relative to output A is equated with a predeterminable signal S1. This incoming phase potential thus leads to the same evaluation result in the radio receiver as a received first predeterminable signal S1. This has the effect, as already described above, that the radio receiver couples the load to the electrical energy source by means of first switching element SE1.

The advantage here is that the electrical load can be turned on when the space is entered and turned off when it is vacated. If the user forgets to actuate switching element SE2 when leaving the space, then the timing element of the presence detector has the effect that after the lapse of the predeterminable time period t, the light is automatically shut off by the presence detector. After the lapse of the predeterminable time period t, presence detector BM sends the second predeterminable signal S2 to the radio receiver.

An alternative embodiment of the above-described embodiment of the second electromechanical switching element SE2 is a momentary contact switch. Input E in this embodiment receives the potential of phase conductor L only for the duration of the keypress for each switching process. This short switching pulse is evaluated at radio receiver FE as a function of the state at output A. That is to say, each switching pulse at input E brings about a change of state at output A. If output A is at zero potential, then a switching pulse at input E brings about a connection of the potential of phase conductor L to electrical load V.

Figure 3:
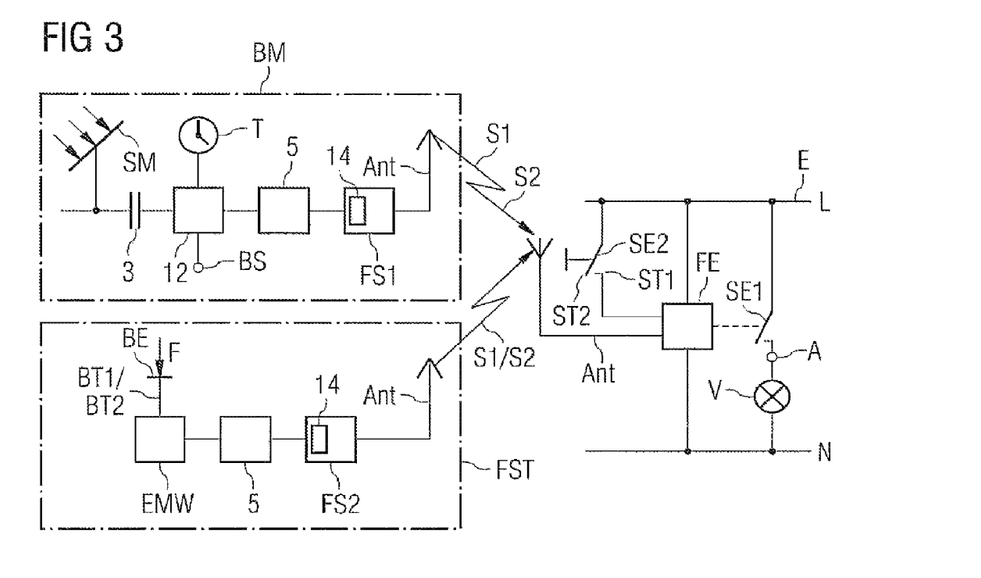

FIG. 3 shows another embodiment, which is expanded with respect to the embodiment from FIG. 1 and also the embodiment from FIG. 2 in that an energy-autonomous wireless switch FST has been added to the system. The energy-autonomous wireless switch FST is constructed in such a way that when a force F is exerted on actuation element BE, an electromechanical energy converter EMW is likewise actuated. Due to a mechanical coupling of actuating element BE to electromechanical energy converter EMW, the input force F is converted at least to a predeterminable extent into electrical energy. A first or second predeterminable signal S1 or S2, respectively, is transmitted by means of this electrical energy. For this purpose, the wireless switch comprises at least one control circuit 5, which is likewise operated with this electrical energy. At least one first and one second actuation sensor BT1 or BT2, respectively, is connected to this control circuit 5. Depending on the actuation direction of actuating element BE, the first or the second actuation sensor BT1 or BT2 is excited. The actuation direction can be determined in that way. If first actuation sensor BT1 is excited, first predeterminable signal S1 is transmitted. If second actuation sensor BT2 is excited, second predeterminable signal S2 is transmitted. Transferred to a practical example, the wireless switch is similar to a toggle switch with a rocker. The rocker comprises a first switching direction for "on" and a second switching direction for "off." The actuation sensors each detect the switching direction so that downstream control circuit 5 passes on this information by means of the actuation sensor to the second radio transmitter FS2. Second radio transmitter FS2 transmits this information by means of a radio signal to an antenna ANT coupled to second radio transmitter FS2. Simple momentary contact switches, which make the corresponding information available to the control circuit by means of a closed contact, are suitable as actuation sensors. The contact switches themselves are energy-free or potential-free switching elements.

A surface wave resonator 14 is provided as a frequency-determining element in the second radio transmitter. The wireless switch offers the advantage of being arranged or installed at an arbitrary site in a space, independently of an existing electrical installation. Surface wave resonator 14 can be of the same construction as that of the presence detector. A distinction of the carrier frequencies at radio receiver FE to decide whether the received signal was transmitted from presence detector BM or wireless switch FST is not necessary.

FIG. 3 thus comprises a variety of possibilities for coupling a load to an energy source or for controlling the coupling of the energy source, and for decoupling the load from the energy source in case of a predeterminable time period without presence.

Figure 4:
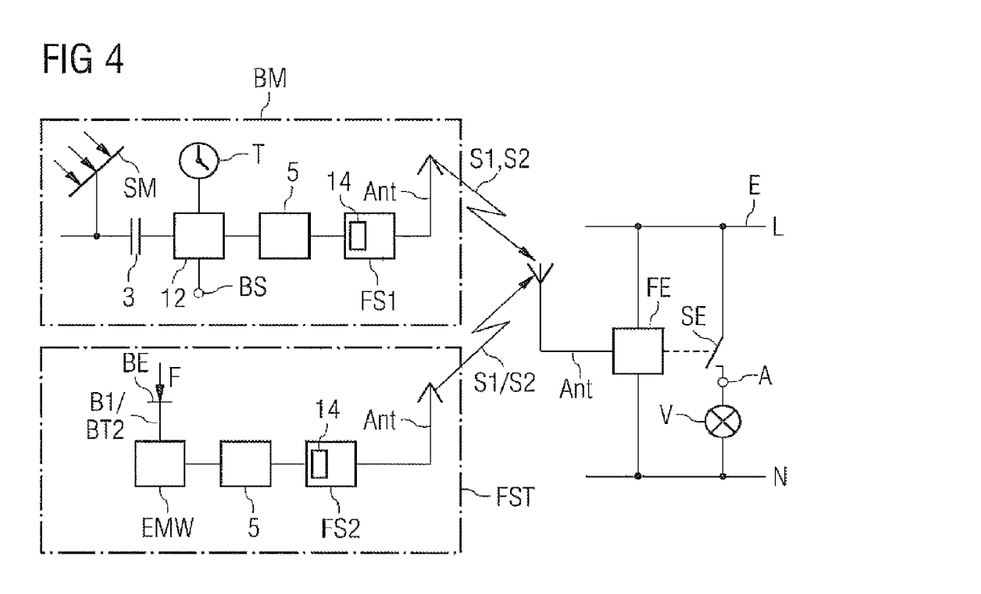

FIG. 4 represents a system similar to the system of FIG. 3, but wherein hardwired switching element SE2 has been eliminated, since this function has been taken over by wireless switch FSD. The embodiment of FIG. 4 is particularly preferable for an installation in which a hardwired switching element SE2 would require considerable installation expense, since installation costs can thereby be saved without impairing the functionality of the overall system.

Figure 5:
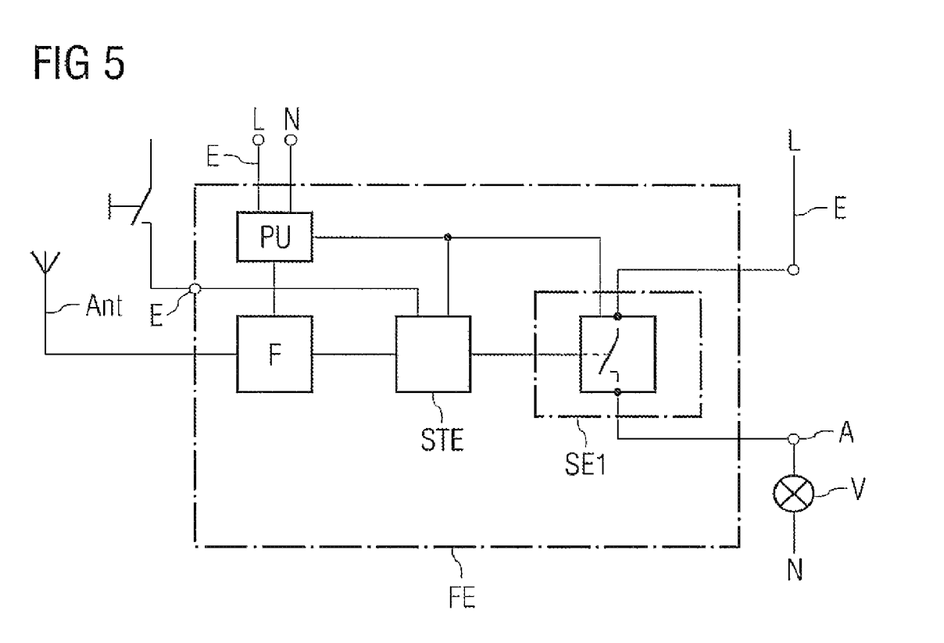

FIG. 5 shows radio receiver FE and its subcomponents in a schematic representation. Radio receiver FE is coupled to energy source E directly, so that a power supply unit PU converts the electrical energy input via the connected alternating current into a DC voltage suitable for the electronic components of radio receiver FE. That is to say, a radio module F of the radio receiver, as well as a control unit STE and switching element SE1 are supplied with electrical energy by power supply unit PU. An antenna Ant, with which the received radio signals are passed on to radio module F, is coupled to radio module F. Radio module F demodulates the radio signals, separates the carrier frequencies from the signals S1 or S2 that are actually to be transmitted, and relays signals S1 or S2 to control unit STE. Control unit STE evaluates the input signals S1 or S2 and transmits a switching signal to first switching element SE1. Switching element SE1 may be a reed contact or a relay contact. In this embodiment, one side of the contact is coupled to the phase conductor of the power supply network, and the electrical load is connected to the other side of the contact. If the contact closes, the potential of the phase conductor is connected to the load. The electrical load, which is connected at output A and is coupled to the neutral conductor of the power supply network, has the electrical energy provided by the power supply network available to it when the contact is closed.

Figure 6:
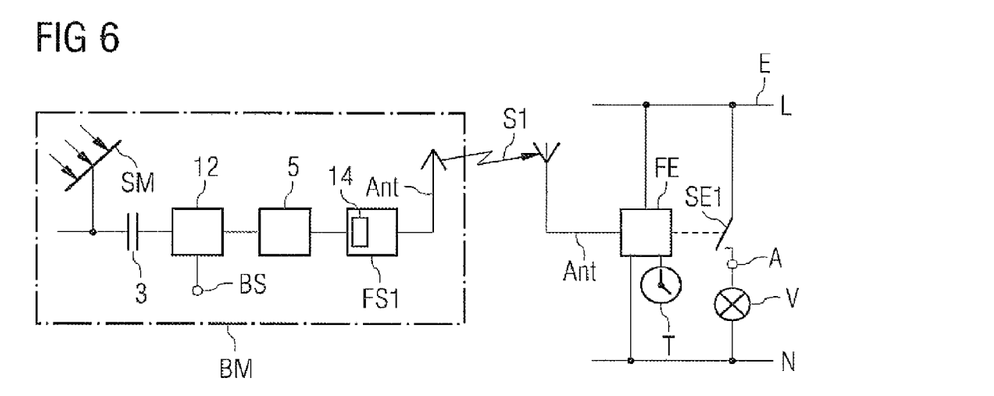

FIG. 6 shows an additional embodiment of the system with presence detector BM and radio receiver FE. In this embodiment as well, radio receiver FE is connected to electrical energy source E. The electrical energy source E is formed in this embodiment and the subsequent ones as well by a power supply network from a 220-230 VAC network. A phase conductor L and a neutral conductor N are provided there. There is a potential difference between these two conductors. Electrical load V can be coupled to energy source E by means of terminal A, which can be connected by radio receiver FE to the potential of phase conductor L. This takes place by means of radio receiver FE and first switching element SE1 coupled to it, which is coupled to electrical energy source E. For this purpose, first switching element SE1 is connected to phase conductor L of electrical energy source E. If first switching element SE1 closes the contact, then phase conductor L and the potential present there is connected to terminal point A, and is available to electrical load V. In this switching state, electrical load V is supplied with electrical energy. First switching element SE1 is coupled to radio receiver FE in such a way that first switching element SE1 is opened or closed by radio receiver FE. The radio receiver has an antenna ANT, with which it receives radio signals and these are supplied to it. The radio receiver itself is likewise connected to energy source E between phase conductor and neutral conductors L and N, respectively. Radio receiver FE in this embodiment comprises a timing element, or is coupled to the timing element. The timing element determines the duration of time that has elapsed since the last reception, and transmits a switching signal after a predeterminable time period has passed.

Presence detector BM is arranged at an installation site remote from the radio receiver. Presence detector BM is supplied with its own energy by means of a storage element 3. The presence detector is thus independent of a hardwired energy source. Storage element 3 is coupled to an energy converter that converts physical environmental conditions into electrical energy. Such an energy converter is formed in the illustration by the schematically represented solar module SM. These may be solar cells, for instance, which convert light into electrical energy. The electrical energy thereby obtained is supplied to storage element 3. The electrical energy of storage element 3 is available by means of an electrical connection between storage element 3 and detector circuit 12 to detector circuit 12 for its operation. Detector circuit 12 is constructed to supply the additional components of presence detector BM with energy. Thus, presence sensor BS, a control circuit and a first radio transmitter FS1 and a connected antenna are connected to the detector circuit. A transmission antenna Ant is connected to the first radio transmitter. The frequency-determining component of the radio transmitter is a surface wave resonator 14.

Presence sensor BS is constructed as an infrared sensor, for example, so that the presence of a person inside the range of presence sensor BS is communicated by an electrical signal to the detector unit. With an appropriate adjustment and calibration of the infrared sensor, it is thus possible to sense the presence of a person even if he is moving only a little or not at all. Detector circuit 12 of presence detector BM evaluates this signal and passes it on to control circuit 5, which is supplied with energy by detector circuit 12 only if presence sensor BS has detected a presence. Control circuit 5 thus begins to convert the information of presence sensor BS into a signal that is emitted by radio transmitter FS1 via an antenna. If the presence detector senses a presence in the area, then a first predeterminable signal S1 is transmitted.

Thus an energy-autonomous presence detector BM is created, which transmits the first predeterminable signal S1 depending on the presence of a person. The transmitted first predeterminable signal S1 is received by radio receiver FE by the latter's antenna ANT. Radio receiver FE evaluates the received signals and determines from them, or recognizes from them, that a signal S1 was received. If radio receiver FE receives first predeterminable signal S1, then switching element SE1 is closed by radio receiver FE and thus the potential of phase conductor L is connected to output A for connecting load V to energy source E. The load, which is arranged between terminal A and neutral conductor N, then has electrical energy available.

The timing element that is coupled to radio receiver FE is reset with each received first predeterminable signal S1 to the "starting value" and begins to run for determined time period t. This repeats with each received predeterminable signal S1. Only after the lapse of the entire predeterminable time period t up to a "final value" does the timing element issue a signal to radio receiver FE, which, by means of this information, performs a decoupling of electrical energy source E from terminal A and thus also from electrical load V.

The arrangement of individual subcomponents of the system with respect to one another is schematically shown in FIG. 6. An installation can be arranged as follows, for example. The radio receiver is arranged in a wall receptacle, in which there is a direct connection of phase and neutral lines. The electrical load, a lighting unit, for example, is arranged on a room ceiling, and is connected to output A and the neutral conductor. The presence detector is arranged remotely therefrom, on a wall opposite one of the room doors, for instance, and covers the entire space with its range. If a person enters the room through the room doors, then the light on the room ceiling turns itself on according to the principle described above. After the person leaves the room, a presence can no longer be determined. At the last sensed presence, the timing element begins to run over the predeterminable time period. If the time period has elapsed, the lighting unit is shut off. The selection of the installation site for the presence detector is ideally guided by its range and the space to be monitored. Due to the energy-autonomous design of the presence detector, it can be installed independently of an existing electrical installation.

Figure 7:
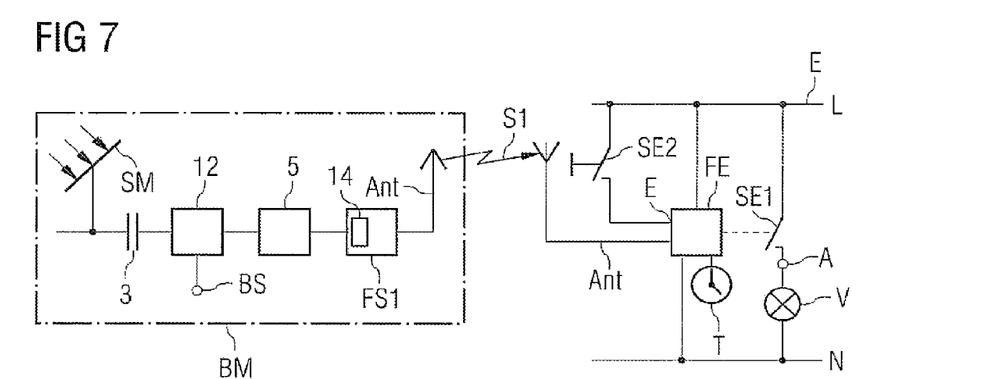

FIG. 7 shows the system arrangement already described in FIG. 6, wherein, in contrast to the embodiment shown in FIG. 1, a possibility for turning the electrical load on and off and a second electromechanical switching element SE2 are provided as an alternative in the embodiment of FIG. 7. Switching element SE2 is connected in this embodiment to phase conductor L and is constructed as a normally open contact. The potential of phase conductor L is thus applied with the second electromechanical switch to the provided input E of the radio receiver. The radio receiver is constructed such that, with respect to output A, a phase potential present at the aforementioned input E is equated with a predeterminable signal S1. This incoming phase potential in the radio receiver leads to the same evaluation results as a received first predeterminable signal S1. This has the result, as already described above, that the radio receiver couples the load to the electrical energy source by means of first switching element SE1.

The advantage is that the electrical load can be turned on when a room is entered and can be again turned off when the room is vacated. If the actuation of switching element SE2 is overlooked when the room is vacated, however, the timing element of the presence detector causes the light to be turned off automatically after the lapse of the predeterminable time period t. After the lapse of the predeterminable time period t, radio receiver FE decouples terminal A, and thus load V as well, from electrical energy source E.

An alternative embodiment of the above-described embodiment of second electromechanical switching element SE2 is a momentary contact switch. In this embodiment, input E receives the potential of phase conductor L only for the duration of the keypress for each switching process. This short switching pulse is evaluated at radio receiver FE as a function of the state at output A. That is to say, each switching pulse at input E brings about a change of state in output A. If output A is at zero potential, then a switching pulse at input E causes a connection of the potential of phase conductor L to electrical load V.

Figure 8:
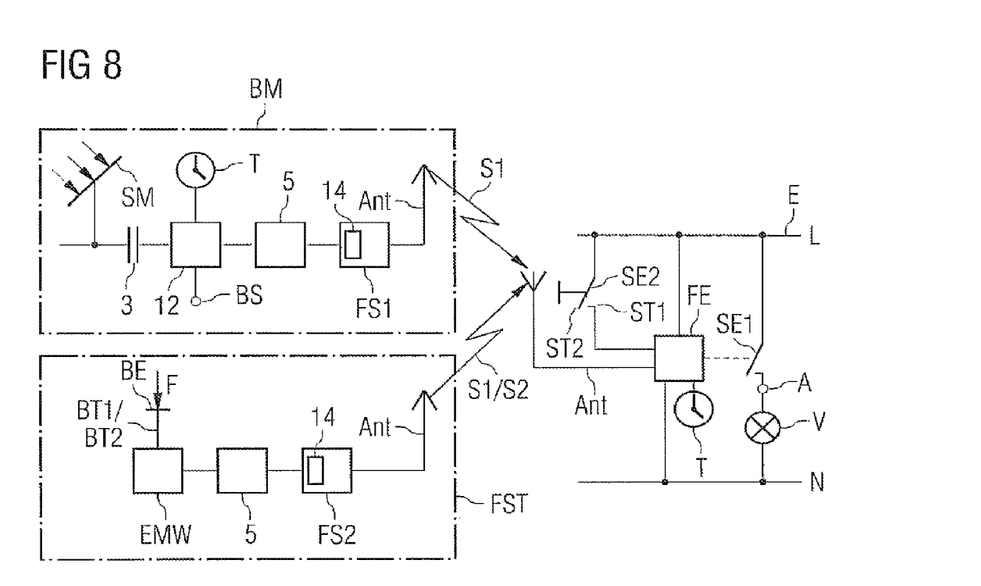

FIG. 8 shows an additional embodiment which is expanded with respect to the embodiment from FIG. 6, as well as the embodiment from FIG. 7, in that an energy-autonomous wireless switch FST is added. The energy-autonomous wireless switch FST is constructed such that when a force F is exerted on an actuating element BE, an electromechanical energy transformer EMW is likewise actuated. The input force F is converted at least to a predetermined extent into electrical energy by a mechanical coupling of actuating element BE to electromechanical energy transformer EMW. A first or a second predeterminable signal S1 or S2, respectively, is transmitted by means of this electrical energy. The wireless switch comprises at least one control circuit 5 for this purpose, which is likewise operated with this electrical energy. At least one first and one second actuation sensor BT1 and BT2 are connected to this control circuit 5. The first or the second actuation sensor BT1 or BT2 is excited, depending on the actuation direction of actuating element BE. The actuation direction is determined in this way. If first actuation sensor BT1 is excited, then first predeterminable signal S1 is transmitted. If second actuation sensor BT2 is excited, then second predeterminable signal S2 is transmitted. Transferred to a practical example, the wireless switch is similar to a toggle switch with a rocker. The rocker comprises a first switching direction for "on" and a second switching direction for "off." The actuation sensors each detect the switching direction so that downstream control circuit 5 passes on this information by means of the actuation sensor to second radio transmitter FS2. Second radio transmitter FS2 transmits this information by means of a radio signal to an antenna ANT coupled to second radio transmitter FS2. Simple momentary contact switches, which make the corresponding information available to the control circuit by means of a closed contact, are suitable as actuation sensors. The contact switches themselves are energy-free or potential-free switching elements.

A surface wave resonator 14 is provided as a frequency-determining element in the second radio transmitter. The wireless switch offers the advantage of being arranged or installed at an arbitrary site in a space, independently of an existing electrical installation. Surface wave resonator 14 can be as the presence detector constructed in the same way. A distinction of the carrier frequencies at radio receiver FE to determine whether the received signal was transmitted from presence detector BM or wireless switch FST is not necessary.

FIG. 8 thus comprises a variety of possibilities for coupling a load to an energy source or for controlling the coupling of the energy source, and for decoupling the load from the energy source in case of a predeterminable time period without a presence.

Figure 9:
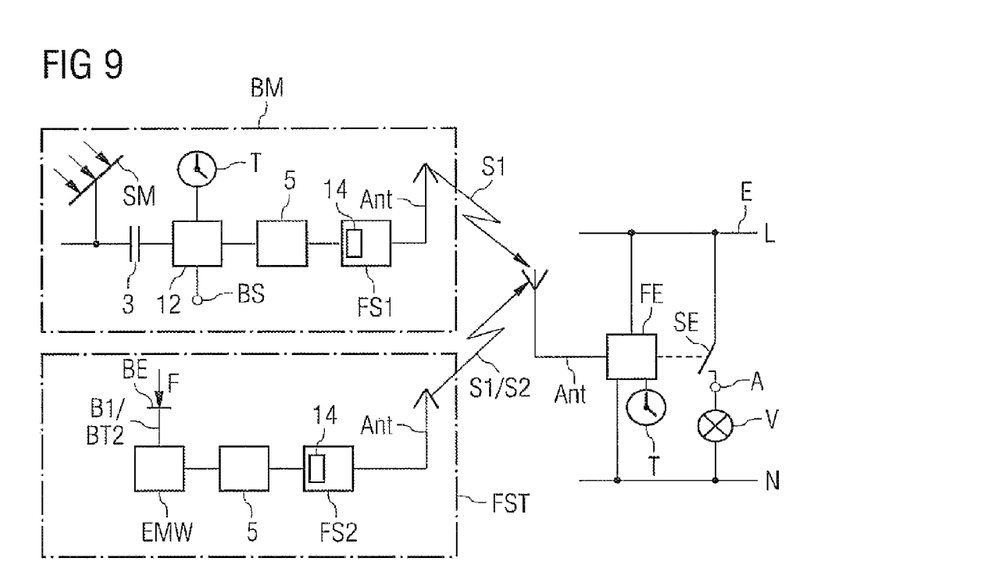

FIG. 9 represents a system similar to the system of FIG. 8, but wherein hardwired switching element SE2 has been eliminated, since this function has been taken over by wireless switch FSD. The embodiment of FIG. 9 is particularly preferable for an installation in which a hardwired switching element SE2 would require considerable installation expense, since installation costs can thereby be saved without impairing the functionality of the overall system.

Figure 10:
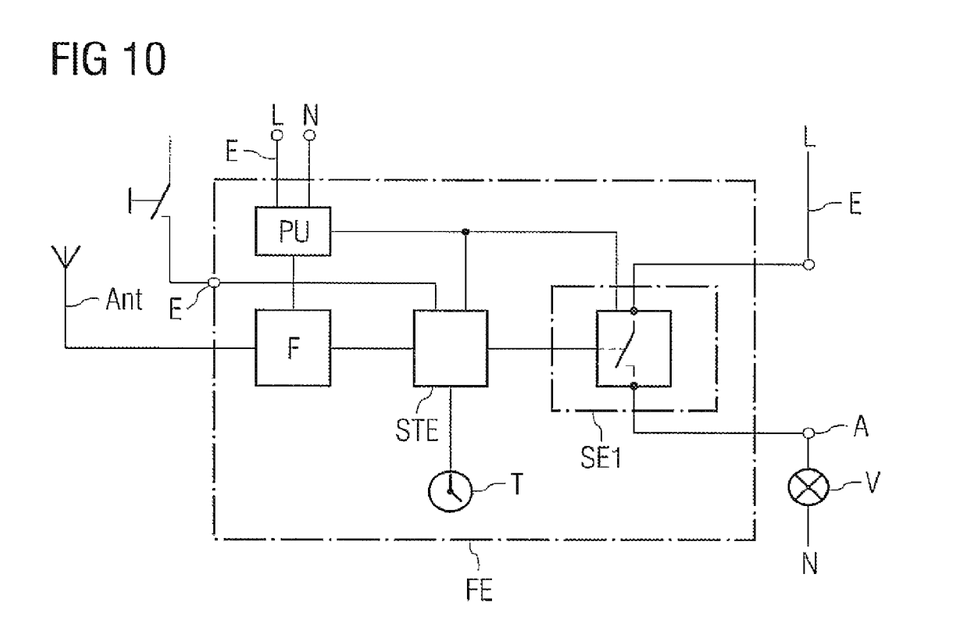

FIG. 10 shows radio receiver FE and its subcomponents in a schematic representation. Radio receiver FE is coupled directly to energy source E, so that a power supply unit PU converts the electrical energy input via the connected alternating current into a DC voltage suitable for the electronic components of radio receiver FE. That is to say, a radio module F of the radio receiver, as well as a control unit STE, a timing element T and a switching element SE1 are supplied with electrical energy by power supply unit PU. An antenna Ant, with which the received radio signals are passed on to radio module F, is coupled to radio module F. Radio module F demodulates the radio signals, separates the carrier frequencies from the signal S1 that is actually to be transmitted, and relays signal S1 to control unit STE. Control unit STE evaluates the input signal S1 and transmits a switching signal to first switching element SE1. Switching element SE1 may be a reed contact or a comparable relay contact. In this embodiment, one side of the contact is coupled to the phase conductor of the power supply network, and the electrical load is connected to the other side of the contact. If the contact closes, the potential of the phase conductor is connected to the load. The electrical load, which is connected at output A and is coupled to the neutral conductor of the power supply network, has the electrical energy provided by the power supply network available to it when the contact is closed.

Figure 11:
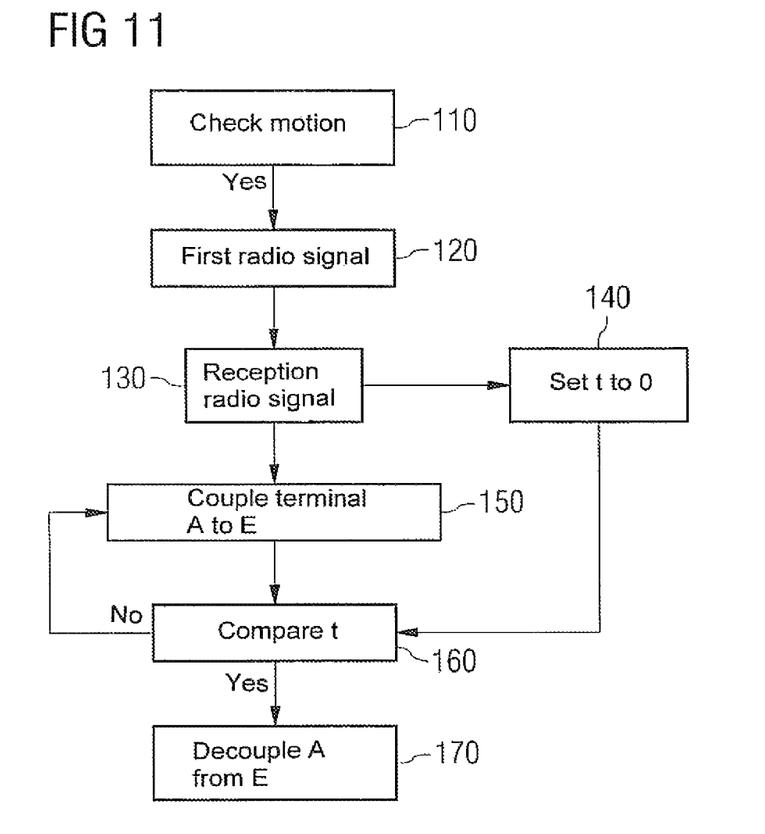

FIG. 11 shows a schematic process sequence with the above-described embodiment, in which the timing element is coupled to the radio receiver. The process begins at an arbitrary time point, at which a presence 110 is sensed by means of the presence detector. This event triggers an internal process at the presence detector, at the end of which a first predeterminable radio signal S1 is transmitted. The radio signal is received by the radio receiver. Reception 130 of the radio signal triggers an internal process at the radio receiver, which essentially comprises the coupling 150 of output A to energy source E, and in parallel therewith, the resetting of the timing element to a "starting value" 140. The timing element now begins to run for a predeterminable time period, until either the time point "final value" is reached or the timing element is reset to the "starting value" by another reception 130 of the first predeterminable radio signal. If the time point "final value" is reached, an internal process begins at the radio receiver, at the end of which the electrical energy source is decoupled from terminal A, and thus also from electrical load V.

Figure 12:
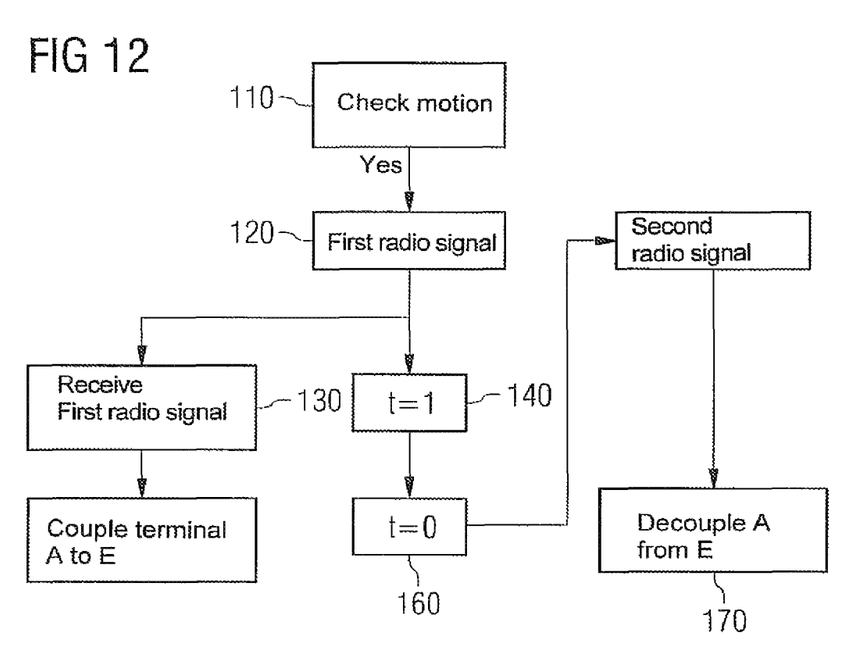

FIG. 12 shows a schematic process sequence with the above-described embodiment, in which the timing element is coupled to the presence detector.

The process begins at an arbitrary time point, at which a presence 110 is sensed by means of presence detector BM. This event triggers an internal process at presence detector BM, at the end of which a first predeterminable radio signal S1 is transmitted on the one hand, and the timing element is reset to a "starting value" 140 on the other. The timing element now begins to run for a predeterminable time period, or to count the lapsed time, until either the time point "final value" is reached, or until a presence is again sensed and the timing element is reset repeatedly to the "starting value." The radio signal is received by the radio receiver. The reception 130 of radio signal S1 triggers an internal process at the radio receiver that comprises the coupling 150 of output A to energy source E. In the interim, the timing element continues to run at presence detector BM and reaches the "final value" 160. This triggers an internal process in presence detector BM, at the end of which second predeterminable radio signal S2 is transmitted. If radio receiver FE receives the second predeterminable radio signal, an internal process begins at the radio receiver, at the end of which the electrical energy source is decoupled from terminal A, and thus from load V as well. With the transmission of second signal S2, all energy-intensive components of the presence detector become inactive or are de-energized.

LIST OF REFERENCE CHARACTERS

BM Presence detector
FE Radio receiver
E Electrical energy source
L Phase conductor
N Neutral conductor
V Electrical load
A Terminal for electrical load
BS Presence sensor
SE1 First switching element
3 Storage element
12 Detector circuit
T Timing element
FS1 First radio transmitter
FS2 Second radio transmitter
S1 First predeterminable signal
S2 Second predeterminable signal
T Predeterminable time period
SE2 Electromechanical switching element
ST Switch position
ST1 First switch position
ST2 Second switch position
FST Wireless switch
BE Actuating element
EMW Electromechanical energy converter
BT1 First actuation sensor
BT2 Second actuation sensor
PU Power unit, power supply
5 Control circuit
2 Photovoltaic element
14 Surface wave resonator
STE Control electronics
Ant Antenna
110 Presence sensed
120 Generates radio signal
130 Reception radio signal
140 Set t to start
150 Couple A to E
160 t to final value
170 Decouple A from E

The invention claimed is:

1. A system comprising:
   a presence detector powered by environmental energy available from a surrounding environment, the presence detector comprising a presence sensor and a first radio transmitter, wherein said presence detector is constructed to send at least a first predeterminable signal by said first radio transmitter, and wherein said presence sensor is coupled to said first radio transmitter, and said presence sensor triggers the transmitting of said first predeterminable signal in response to a sensed presence;
   a terminal for an electrical load;
   a radio receiver, which is constructed to couple said terminal by a first switching element to an electrical energy source in response to receiving the first predeterminable signal, and which is constructed to decouple said terminal by said first switching element from the electrical energy source after a time point of a last reception of said first predeterminable signal;
   a wireless switch constructed to transmit, wirelessly, at least one of the first predeterminable signal and a second predeterminable signal by a second radio transmitter, wherein the wireless switch generates electrical energy used to transmit the at least one of the first predeterminable signal and the second predeterminable signal by converting, with an actuating element that is coupled to an electromechanical energy converter, a mechanical force exerted on said actuating element into the electrical energy which is conducted to said second radio transmitter.

2. The system according to claim 1, wherein the energy for operating the presence detector and its components is supplied by a photoelectric energy converter.

3. The system according to claim 1, wherein said radio receiver is coupled to a hardwired electromechanical switching element in such a way that a first switch position of a second switching element at said radio receiver generates an input signal that excites the radio receiver to couple the electrical load by said first switching element to the electrical energy source, and a second switch position disconnects the input signal from the radio receiver so that the electrical load is decoupled from the electrical energy source.

4. The system according to claim 1, wherein said radio receiver is coupled to a hardwired electromechanical switching element, which is constructed as a momentary contact switch, in such a way that a first switching pulse at the radio receiver causes the electrical load to be coupled to the electrical energy source by said first switching element, and a second switching pulse causes the electrical load to be decoupled from the electrical energy source.

5. The system according to claim 1, wherein said wireless switch comprises a first actuation sensor that senses an actuation of said actuating element in a first direction, and a second actuation sensor that senses an actuation of said actuating element in a second direction.

6. The system according to claim 5, wherein said first predeterminable signal is transmitted in response to the first actuation sensor sensing actuation of said actuating element in said first actuation direction and said second predeterminable signal is transmitted in response to the second actuation sensor sensing actuation of said actuating element in said second actuation direction.

7. The system according to claim 1, wherein said presence detector comprises:
   a storage element configured to store electrical energy;
   a control unit configured to encode a detected presence;
   a detector circuit configured to activate the control circuit in the presence of a predeterminable electrical signal at said presence sensor and to deactivate the control circuit after decay of the predeterminable electrical signal; and
   a photovoltaic element to which said storage element is connected for supplying energy to said presence detector.

8. The system according to claim 7, wherein said detector circuit is operated in a pulsed mode, wherein an off-phase is longer than an on-phase.

9. The system according to claim 7, wherein said storage element is a capacitor and/or an electrochemical energy accumulator.

10. The system according to claim 7, wherein said presence sensor is an infrared sensor.

11. The system according to claim 10, wherein the infrared sensor is equipped with a lens for concentrating the infrared radiation fields.

12. The presence detector according to claim 1, wherein the first radio transmitter comprises a surface wave resonator as a frequency-determining component.

13. The presence detector according to claim 1, wherein the radio receiver comprises a timer and the radio receiver is configured to decouple said terminal from the electrical energy source in response to the timer indicating a predetermined period of time has passed since the last receipt of the first predeterminable signal.

14. The presence detector according to claim 1, wherein the radio receiver is configured to decouple said terminal from the electrical energy source in response to the radio receiver receiving the second predeterminable signal from one of the presence detector and the wireless switch.

15. A method for use with a presence detector comprising:
   transmitting by a presence detector a first predeterminable signal after a sensed presence;
   receiving the first predeterminable signal;
   coupling a terminal for an electrical load by a radio receiver to an electrical energy source by a switching element in response to receiving the first predeterminable signal;
   after lapse of a predetermined time period following the time of a last reception of the first predeterminable signal, decoupling the terminal by the switching element from the electrical energy source;
   supplying energy for operating the presence detector and its components from environmental energy available from the environment;
   providing one of the first predeterminable signal and a second predeterminable signal by a wireless switch; and
   powering the wireless switch with electrical energy generated by converting a mechanical force exerted on an actuating element included in the wireless switch into the electrical energy used to transmit at least one of the first predeterminable signal and the second predeterminable signal.

* * * * *

UNITED STATES PATENT AND TRADEMARK OFFICE
CERTIFICATE OF CORRECTION

| | |
|---|---|
| PATENT NO. | : 8,970,342 B2 |
| APPLICATION NO. | : 14/012792 |
| DATED | : March 3, 2015 |
| INVENTOR(S) | : Frank Schmidt, Armin Anders and Christian Bach |

It is certified that error appears in the above-identified patent and that said Letters Patent is hereby corrected as shown below:

On the title page

The address of the Applicant item 71 should be corrected as follows:

IN THE APPLICANT NAMES

Applicant: EnOcean GmbH, Oberhaching (DE)

The address of the third inventor item 72 should be listed as follows:

IN THE INVENTOR NAMES

Christian Bach, Ottobrunn (DE)

The address of the Assignee item 73 should be corrected as follows:

IN THE ASSIGNEE NAMES

Assignee: EnOcean GmbH, Oberhaching (DE)

Signed and Sealed this
Second Day of February, 2016

Michelle K. Lee
*Director of the United States Patent and Trademark Office*